US008826264B1

(12) United States Patent
Chhabra et al.

(10) Patent No.: US 8,826,264 B1
(45) Date of Patent: Sep. 2, 2014

(54) NON-DISRUPTIVE UPGRADE OF APPLICATIONS

(75) Inventors: Nitin Chhabra, Karnataka (IN); Nithin Surendran, Kerala (IN); Ajith Balakrishnan, Karnataka (IN); Ankur Dixit, Karnataka (IN); Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 257 days.

(21) Appl. No.: 13/536,364

(22) Filed: Jun. 28, 2012

(51) Int. Cl.
G06F 9/44 (2006.01)
G06F 13/10 (2006.01)
G06F 13/12 (2006.01)
G06F 15/16 (2006.01)
G06F 9/445 (2006.01)
G06F 9/46 (2006.01)

(52) U.S. Cl.
USPC ............ 717/170; 703/21; 709/219; 717/168; 717/171; 717/173; 717/175; 718/104; 718/107

(58) Field of Classification Search
None
See application file for complete search history.

(56) References Cited

U.S. PATENT DOCUMENTS

| 5,764,992 | A  | * | 6/1998  | Kullick et al. ................ 717/170 |
|-----------|----|---|---------|-----------------------------------------|
| 6,070,012 | A  | * | 5/2000  | Eitner et al. .................. 717/168 |
| 7,194,616 | B2 | * | 3/2007  | Axnix et al. ................... 718/104 |
| 7,769,931 | B1 |   | 8/2010  | Angelone et al.                         |
| 7,890,664 | B1 |   | 2/2011  | Tao et al.                              |
| 7,904,681 | B1 |   | 3/2011  | Bappe et al.                            |
| 8,122,158 | B1 |   | 2/2012  | Kudva et al.                            |
| 8,438,315 | B1 |   | 5/2013  | Tao et al.                              |
| 8,452,856 | B1 | * | 5/2013  | Lent et al. ...................... 709/219 |
| 2003/0120914 | A1 |  | 6/2003  | Axnix et al.                           |
| 2004/0060047 | A1 | * | 3/2004  | Talati et al. .................... 717/175 |
| 2004/0139175 | A1 | * | 7/2004  | Lin ................................. 717/171 |
| 2006/0288349 | A1 | * | 12/2006 | Zimmer et al. ................ 718/107 |
| 2008/0221856 | A1 | * | 9/2008  | Dubnicki et al. ............... 703/21 |
| 2009/0133009 | A1 | * | 5/2009  | Talati et al. .................... 717/168 |
| 2011/0252231 | A1 |   | 10/2011 | Mishra                                  |
| 2012/0144382 | A1 | * | 6/2012  | Matthew et al. .............. 717/173 |
| 2012/0291021 | A1 | * | 11/2012 | Banerjee et al. .............. 717/173 |
| 2013/0055234 | A1 | * | 2/2013  | Limbasia et al. ............. 717/173 |

OTHER PUBLICATIONS

Jim Gray et al., High-Availability Computer Systems, 1991, [Retrieved on Oct. 10, 2013]. Retrieved from the internet: <URL: http://ieeexplore.ieee.org/stamp/stamp.jsp?tp=&arnumber=84898> 10 Pages. (39-48).*

(Continued)

*Primary Examiner* — Don Wong
*Assistant Examiner* — Anibal Rivera
(74) *Attorney, Agent, or Firm* — BainwoodHuang

(57) ABSTRACT

A non-disruptive upgrade (NDU) technique involves installing and activating a first copy of a new version of an application in a temporary directory to (i) obtain control from an original version of the application while the original version is installed in an application directory and (ii) shut down the original version. The technique further involves, after the first copy of the new version obtains control from the original version and the original version is shut down, installing and activating a second copy of the new version of the application in the application directory to (i) obtain control from the first copy of the new version while the first copy of the new version is installed in the temporary directory and (ii) shut down the first copy of the new version. Such operation maintains the continuity of work at each phase of the NDU technique.

19 Claims, 5 Drawing Sheets

(56) References Cited

OTHER PUBLICATIONS

Sameer Ajmani, A Review of Software Upgrade Techniques for Distributed Systems, 2004, [Retrieved on Oct. 24, 2010]. Retrieved from the internet: <URL: http://citeseerx.ist.psu.edu/viewdoc/download?doi=10.1.1.5.9679&rep=rep1&type=pdf> 19 Pages (1-19).*

* cited by examiner

NON-DISRUPTIVE UPGRADE OF APPLICATIONS

BACKGROUND

A conventional approach to upgrading a software application which is running on a computer system involves shutting down a first version of the application. Once the first version of the application is shut down, a user installs a second version of the application in place of the first version, and then starts the second version of the application. From that point forward, the second version of the application runs on the computer system in place of the first version.

Some upgrade procedures install the second version of the application on the computer system in the same location that is initially occupied by the first version of the application. Additionally, some upgrade procedures require removal of the first version of the application from the computer system before installing the second version of the application.

The user may perform these upgrade steps manually. Alternatively, the user may run a script which invokes an installer that performs these upgrade steps in a more automated manner.

SUMMARY

Unfortunately, there are deficiencies to the above-described conventional approaches to upgrading a software application which is running a computer system. For example, when the user shuts down the first version of the application, the continuity of the work performed by the application is broken. That is, there is no work performed by any version of the application while the first version of the application is shut down and replaced with the second version.

Furthermore, other software components may rely on the availability of that application for services, etc. Accordingly, while the application is shut down, the continuity of work performed by these other components is broken as well.

Moreover, users may rely on the availability of that application for services. Unfortunately, in such situations, the above-described conventional upgrade approach exposes users to downtime as well.

In contrast to the above-described conventional approaches in which the continuity of work performed by the software application is broken while the application is shut down, improved techniques involve performing a non-disruptive upgrade (NDU) of an application in a manner which maintains continuity of work. In particular, the NDU replaces an older version of the application with a newer version of the application while a temporarily-installed version of the application (e.g., another copy of the newer version) continues to perform work. Such operation results in little or no disruption of the services provided by the application while the older version is replaced with the newer version.

One embodiment is directed to a method of upgrading an original version of an application to a new version of the application. The method includes installing and activating a first copy of a new version of an application in a temporary directory to (i) obtain control from an original version of the application while the original version is installed in an application directory and (ii) shut down the original version. The method further includes, after the first copy of the new version obtains control from the original version and the original version is shut down, installing and activating a second copy of the new version of the application in the application directory to (i) obtain control from the first copy of the new version while the first copy of the new version is installed in the temporary directory and (ii) shut down the first copy of the new version. Such operation maintains the continuity of work at each phase of the NDU technique.

In some arrangements, activating the first copy of the new version of the application includes directing the first copy of the new version of the application to (i) establish a communications channel between the original version of the application and the first copy of the new version of the application, and (ii) await receipt of a transfer acknowledge signal from the original version of the application through the communications channel. Along these lines, the transfer acknowledge signal from the original version of the application indicates (i) that the original version of the application has completed all previously started operations which were previously started by the original version of the application in response to previous external requests, and (ii) that the first copy of the new version of the application has control to start new operations in response to new external requests which were queued while the original version of the application was completing the previously started operations.

In some arrangements, the method further includes (i) preventing the original version of the application from initiating new operations in response to the new external requests and (ii) queuing the new external requests while the original version of the application completes all previously started operations which were previously started by the original version of the application in response to previous external requests. Such operation preserves consistency and integrity when handling external requests during transfer of control.

Other embodiments are directed to systems, apparatus, processing circuits, computer program products, and so on. Some embodiments are directed to various methods, electronic components and computerized circuitry which are involved in upgrading an original version of an application to a new version of the application in a non-disruptive manner.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves performing a non-disruptive upgrade of an application in a manner which maintains continuity of work. In particular, this technique includes replacement of an older version of the application with a newer version of the application while a temporarily-installed version of the application continues to perform such work.

Such operation results in little or no disruption of the services provided by the application while the older version is replaced with the newer version. That is, the improved techniques provide an effective solution to the problem of application downtime during upgrade. Such techniques define an effective protocol for non-disruptive upgrade for any conforming application.

Figure 1:
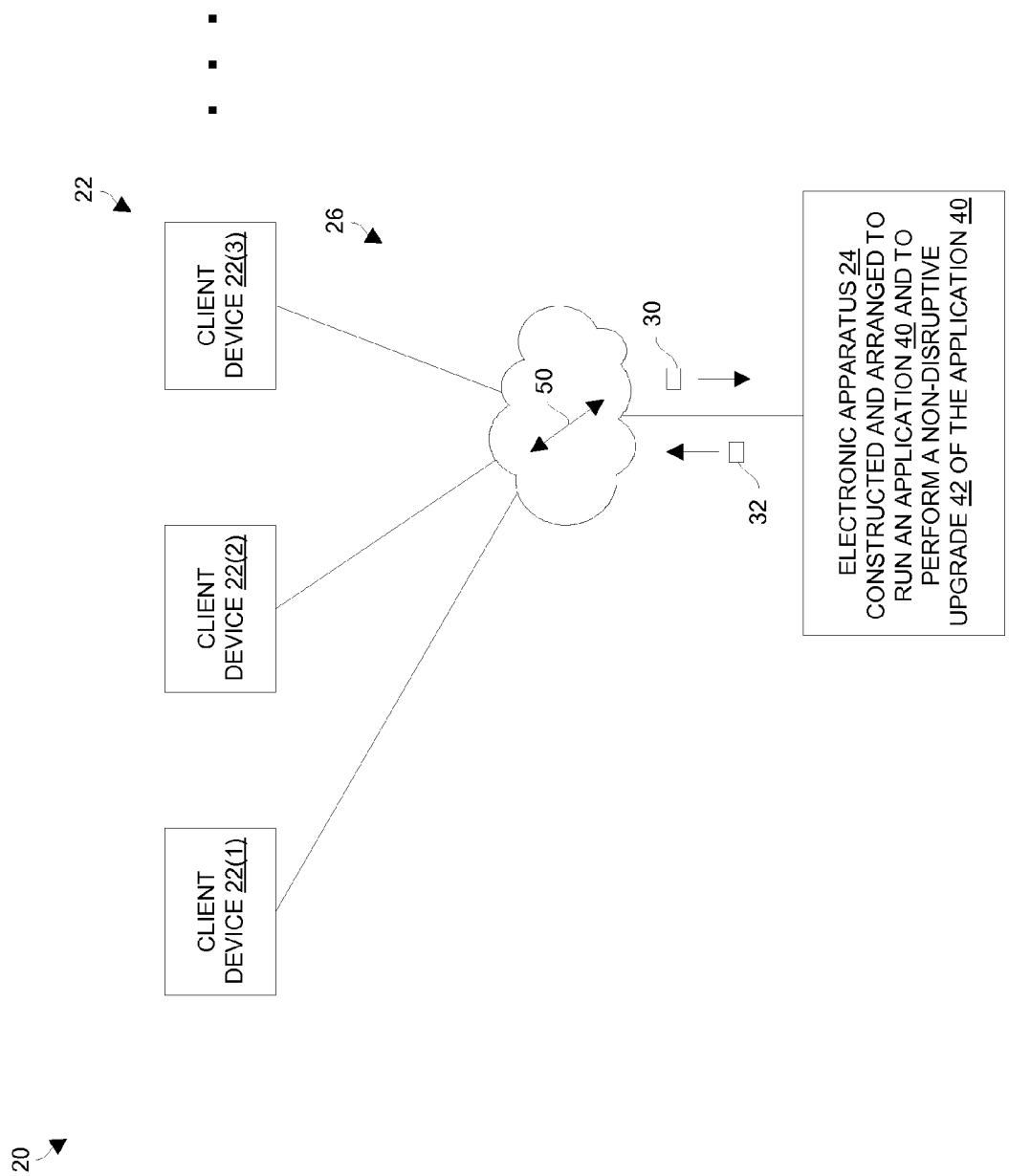
FIG. 1 is a block diagram of an electronic system which is suitable for employing non-disruptive upgrade (NDU) techniques.

FIG. 1 shows an electronic system 20 which performs a non-disruptive upgrade of an application to maintain continuity of work. The electronic system 20 includes client devices 22(1), 22(2), 22(3), . . . (collectively, client devices 22), an electronic apparatus 24, and a communications medium 26.

Each client device 22 is constructed and arranged to perform useful work by, among other things, providing external requests 30 for services 32 to the electronic apparatus 24 through the communications medium 26. Examples of suitable client devices 22 include mobile devices, tablets, other thinly provisioned smart devices, general purpose computers, and so on. Accordingly, each client device 22 is capable of obtaining services 32 from the electronic apparatus 24 by running a set of local applications, e.g., to create and edit documents, to exchange email or other forms of communication, to perform transactions, etc.

The electronic apparatus 24 is constructed and arranged to run an application 40 to provide such services 32 to the client devices 22. Additionally, the electronic apparatus 24 is constructed and arranged to perform a non-disruptive upgrade (NDU) 42 of the application 40 in which there is little or no interruption of such services 32. Examples of suitable electronic apparatus 24 include data storage arrays, file servers, web servers, online stores, host computers for financial or banking systems, machines which monitor events and log transactions, and so on. For such an electronic apparatus 24, an importance may be placed on providing continuous services 32 from the application 40 (i.e., high availability) even while upgrading the application 40.

The communications medium 26 connects the various components of the electronic system 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Also, portions of the communications medium 26 may be SAN-based, while other portions of the communications medium 26 may be LAN-based.

During operation, the electronic apparatus 24 runs an original (or existing) version of the application 40 to provide services 32 in response to external requests 30. At some point, the electronic apparatus 24 performs an NDU 42 of the application 40 in which there is little or no interruption of services 32. Along these lines, the NDU 42 involves a two phase approach to application upgrade.

In the first phase, while the original version of the application 40 runs from an application directory to process the external requests 30, a temporary version of the application 40 installs within a temporary directory and then takes over control of processing the external requests 30. In the second phase, while the temporary version of the application 40 runs from the temporary directory, a new version of the application 40 installs within the application directory in place of the original version of the application 40 and then takes over control of processing the external requests 30. Such operation avoids application downtime during NDU 42. Accordingly, users and any dependent applications never face any disruption of the services 32. Further details will now be provided with reference to FIG. 2.

Figure 2:
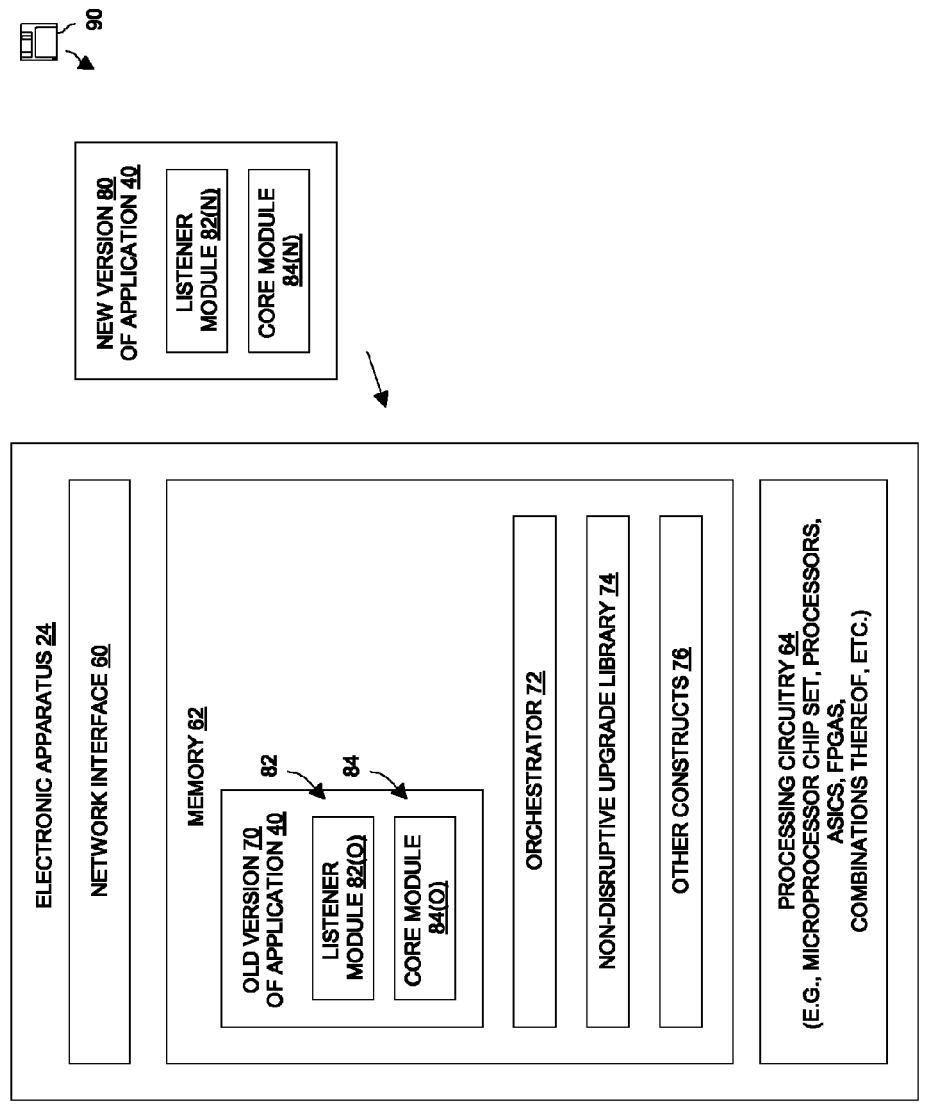
FIG. 2 is a block diagram of an electronic apparatus of FIG. 1.

FIG. 2 shows particular details of the electronic apparatus 24. As shown, the electronic apparatus 24 includes a network interface 60, memory 62, and processing circuitry 64.

The network interface 60 is constructed and arranged to connect the electronic apparatus 24 to the communications medium 26. Accordingly, the network interface 60 enables the electronic apparatus 24 to communicate with the other components of the electronic environment 20.

The memory 62 is constructed and arranged to hold a variety of software constructs to facilitate operation of the electronic apparatus 24. In particular and as shown in FIG. 2, the memory 62 initially stores an old (or existing) version 70 of the application 40, an orchestrator 72, an NDU library 74, and other constructs 76. The old version 70 of the application 40, when running on the electronic apparatus 24, provides the earlier-mentioned services 32 (also see FIG. 1). The orchestrator (or installer) 72 is constructed and arranged to direct the electronic apparatus 24 through an NDU 42. The NDU library 74 implements the NDU protocol (e.g., the NDU library 74 may be in the form of a .DLL or similar dynamic library which provides a suite of routines, functions, procedure calls, etc. for use by the application 40 and the orchestrator 72). The other constructs 76 refer to additional software constructs which provide a robust and reliable operating environment (e.g., an operating system, drivers, other libraries, data files, utilities, scripts, other higher level applications, etc.).

During operation, the processing circuitry 64 runs the various software constructs stored in the memory 62 in order to perform various operations. For example, when the processing circuitry 64 runs the old version 70 of the application 40, the processing circuitry 64 performs useful work. Along these lines, the processing circuitry 64 is capable of providing services 32 locally (e.g., to other applications running locally) and/or externally to the client devices 22 (FIG. 1) in response to received requests 30.

At some point during operation of the electronic apparatus 24, the old version 70 of the application 40 may be upgraded to a new version 80 of the application 40. In particular, the orchestrator 72 (e.g., when invoked by a user) is capable of performing a non-disruptive upgrade 42 of the application 40 thus avoiding application downtime. Although further details of the NDU 42 will be provided shortly, it should be understood that the orchestrator 72 is able to accomplish the NDU 42 by running multiple copies of the new version 80 of the application 40, i.e., a first copy of the new version 80 while replacing the old version 70 of the application in order to maintain continuity of work and a second copy of the new version 80 which ultimately replaces the old version 70.

As shown in FIG. 2, each version 70, 80 of the application 40 includes a listener (or front-end) module 82 which enables that version 70, 80 to communicate with another version 70, 80 of the application 40, and a core module 84 which performs the main operations of the application 40. In particular, the old version 70 of the application 40 includes a listener module 82(O) and a core module 84(O). Similarly, the new version 80 of the application 40 includes a listener module 82(N) and a core module 84(N). In some arrangements, when the application 40 supports NDU, the application 40 further includes a switch to indicate, during installation, whether the application 40 is going to be a fresh install or an upgrade.

It should be understood that the processing circuitry 64 can be implemented in a variety of ways including via one or more processors running specialized software, processor chip sets, processing modules, etc. Additionally, at least some of the processing circuitry 64 may be formed via application specific ICs (ASICs), field programmable gate arrays (FPGAs) and associated programs, discrete components, analog circuits, other hardware circuitry, combinations thereof, and so on. In the context of one or more processors running specialized software, a computer program product 90 is capable of delivering all or portions of the software to the electronic apparatus 24. The computer program product 90 has a non-transitory (or non-volatile) computer readable medium which stores a set of instructions which controls one or more operations of the electronic apparatus 24. Examples of suitable computer readable storage media include tangible articles of manufacture and apparatus which store instructions in a non-volatile manner such as CD-ROM, flash memory, disk memory, tape memory, and the like. Further details of the NDU 42 will now be provided with reference to FIGS. 3 and 4.

Figure 3:
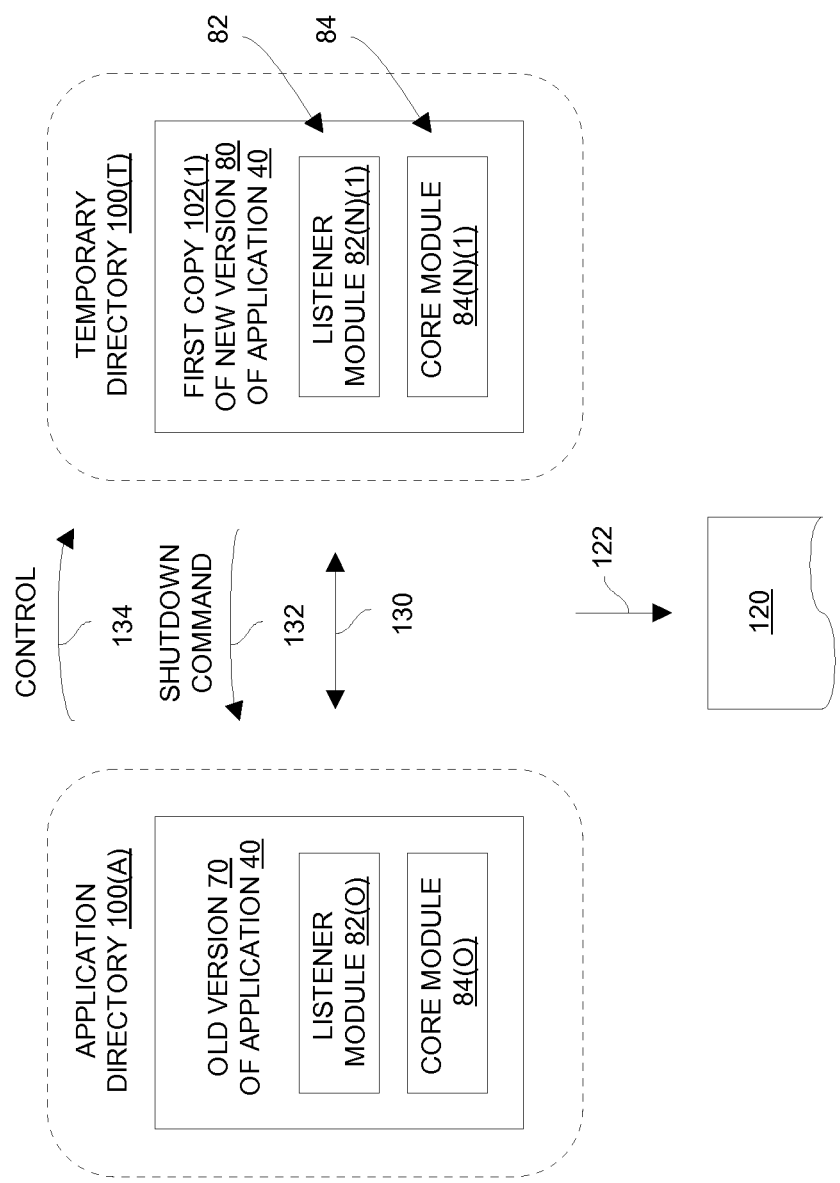
FIG. 3 is a block diagram of portions of memory of the electronic apparatus of FIG. 2 during a first phase.
Figure 4:
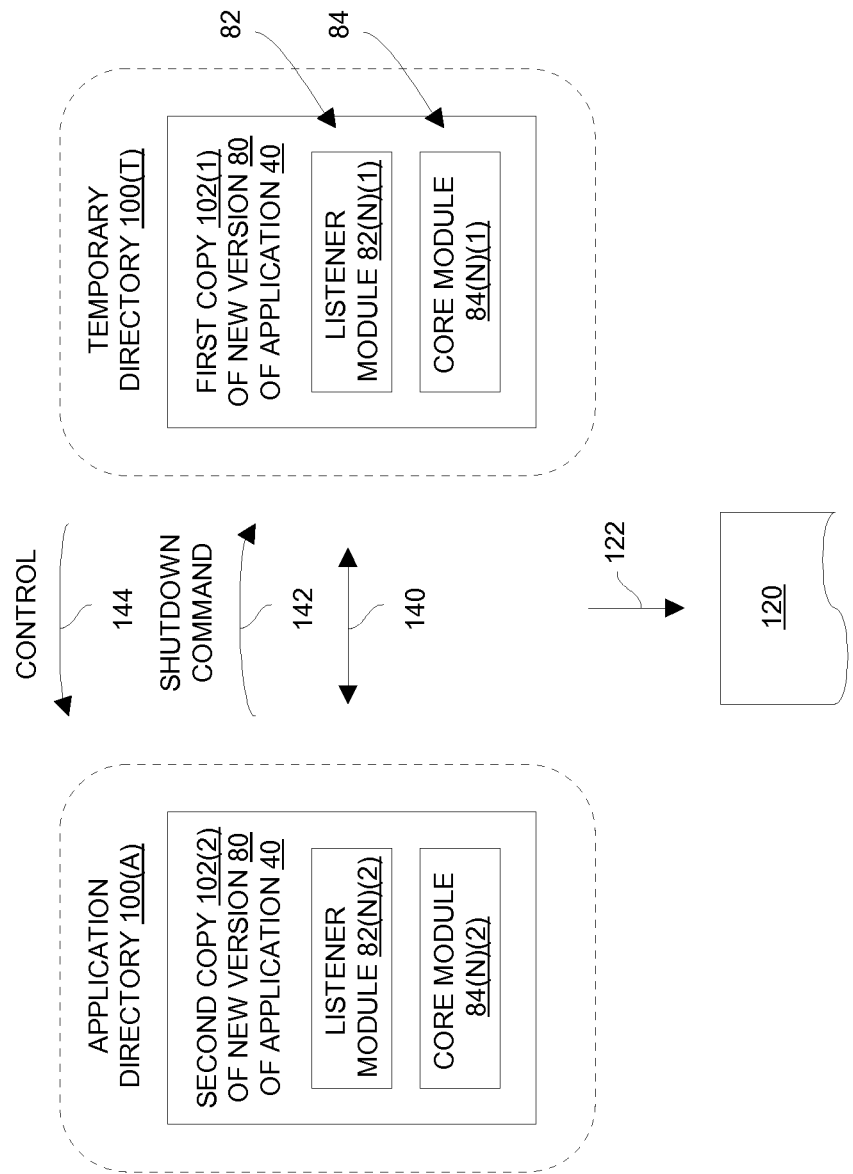
FIG. 4 is a block diagram of portions of the memory of the electronic apparatus of FIG. 2 during a second phase.

FIGS. 3 and 4 illustrate details of the two phase NDU technique. FIG. 3 shows an application directory 100(A) and a temporary directory 100(T) within the memory 62 of the electronic apparatus 24 during the first phase of the NDU 42. FIG. 4 shows the application directory 100(A) and the temporary directory 100(T) during the second phase of the NDU 42.

Prior to the start of the NDU 42, the old version 70 of the application 40 and the NDU library 74 reside in the application directory 100(A) (also see FIG. 2) perhaps along with one or more other software constructs (e.g., the orchestrator 72, data files, etc.). The listener module 82(O), which was immediately activated upon installation of the old version 70, listens for NDU-related communications. The core module 82(O), which performs a set of primary application operations, delivers services 32 in response to requests 30 (also see FIG. 1). At this point, the temporary directory 100(T) is empty or perhaps has not yet been created.

At the beginning of the first phase of the NDU 42, a user invokes the orchestrator 72 (FIG. 2) and commands the orchestrator 72 to perform the NDU 42. In response, the orchestrator 72 creates a transaction log 120 and the temporary directory 100(T) if the temporary directory 100(T) has not yet been created. One of ordinary skill in the art would understand this to mean that it is actually the processing circuitry 64, while executing instructions of the orchestrator 72 stored in the memory 62, that performs the NDU 42.

After each NDU activity, the orchestrator 72 and the versions 70, 80 of the application 40 then provide status 122 to the transactions log 120. Such operation enables the orchestrator 72 and the versions 70, 80 of the application 40 to determine where the NDU 42 stopped, and perhaps continue from that point, in the event that the NDU 42 was interrupted (e.g., the electronic apparatus 24 may have rebooted during the NDU 42).

Next, the orchestrator 72 (FIG. 2) installs a first copy 102(1) of the new version 80 of the application 40 in the temporary directory 100(T) (FIG. 3), and directs the listener (or front-end) module 82(N)(1) of the first copy 102(1) of the new version 80 of the application 40 to establish a communications channel 130 with the listener module 82(O) of the old version 70 of the application 40. A variety of communications mechanisms are suitable for use as the communications channel 130 such as RPCs, inter-process communications, etc. Formation of the communications channel 130 is represented by the double arrow 130. In some arrangements, the orchestrator 72 sets a switch within the new version 80 of the application 40 to indicate that the installation is not a fresh install but rather is an upgrade.

Once the communications channel 130 has been established between listener modules 82, the listener module 82(N)(1) sends a shutdown command 132 to the listener module 82(O). The old version 70 of the application 40 responds to the shutdown command 132 by causing (i) new requests 30 for service 32 to be queued rather than start new operations, and (ii) completion of all operations that had been already started. While the old version 70 of the application 40 completes the previously started operations, the old version 70 of the application 40 is prevented from starting new operations based on newly received requests 30. In some arrangements, the newly received requests 30 are queued in persistent memory to prevent data loss in the event of a reboot.

As soon as the operations that had been already started have completed, the core module 84(O) stops operation including no longer receiving and queuing new requests, and shuts down, and the listener module 82(O) sends a control signal 134 to the listener module 82(N)(1). The control signal 134 is effectively a transfer acknowledge signal indicating (i) that the old version 70 of the application 40 has completed all previously started operations which were previously started by the original version of the application in response to previous external requests 30, and (ii) that the first copy 102(1) of the new version 80 of the application 40 now has control to start new operations in response to new requests 30 which were queued while the original version 70 of the application 40 was completing the previously started operations.

The location of the queue of requests may be sent to the listener module 82(N)(1) as part of or along with the control signal 134. Alternatively, the queue of requests may be located in a place known to both the old version 70 and the first copy of the new version 80, or communicated to each version 70, 80 by the orchestrator 72.

Upon receipt of the control signal 134 by the listener module 82(N)(1), the core module 84(N)(1) processes the requests 30 thus maintaining continuity of work. In particular, any delay in providing services 32 by the application 40 is at most the amount of time required to (i) complete the operations that were in progress by the old version 80 and (ii) transfer control to the first copy 102(1) of the new version 80. With the first copy 102(1) of the new version 80 of the application 40 now running in the electronic apparatus 24 and providing services 32 in response to new requests 30, the first phase ends and the second phase begins.

At the beginning of the second phase, the orchestrator 72 (FIG. 2) replaces the old version 70 of the application 40 with a second copy 102(2) of the new version 80 of the application 40 (also see FIG. 4). In some arrangements, the orchestrator 72 uninstalls (or deletes) the old version 70 of the application 40 from the application directory 100(A) prior to installing the second copy 102(2) of the new version 80 of the application 40 into the application directory 100(A). At this point, the first copy 102(1) of the new version 80 of the application 40 in the temporary directory 100(T) is still running, but the second copy 102(2) of the new version 80 of the application 40 in the application directory 100(A) is now ready to run.

Next, the orchestrator 72 transitions control from the first copy 102(1) of the new version 80 to the second copy 102(2) of the new version 80. In particular, the orchestrator 72 directs the listener module 82(N)(2) to establish a communications channel 140 to the listener module 82(N)(1). Once the communications channel 140 has been established between listener modules 82, the listener module 82(N)(2) sends a shutdown command 142 to the listener module 82(N)(1).

The first copy 102(1) of the new version 80 of the application 40 responds to the shutdown command 142 by causing (i) additional requests 30 for service 32 to be queued rather than start new operations, and (ii) completion of all operations that had been already started by the core module 84(N)(1). While the first copy 102(1) of the new version 80 of the application 40 completes the previously started operations, the first copy 102(1) is prevented from starting new operations based on additionally received requests 30.

As soon as the operations that had been already started have completed by the first copy 102(1), the core module 84(N)(1) stops operation including no longer receiving and queuing new requests, and shuts down, and the listener module 82(N)(1) sends a control signal 144 to the listener module 82(N)(2) of the second copy 102(2). The control signal 144 is effectively a transfer acknowledge signal indicating (i) that the first copy 102(1) of the new version 80 of the application 40 has completed all previously started operations which were previously started by the original version of the application in response to previous external requests 30, and (ii) that the second copy 102(2) of the new version 80 of the application 40 now has control to start new operations in response to new requests 30 which were queued while the first copy 102(1) of the new version 80 of the application 40 was completing the previously started operations.

The location of the queue of requests may be sent to the listener module 82(N)(2) as part of or along with the control signal 144. Alternatively, the queue may be located in a place known to the new version 80 or communicated to the new version 80 by the orchestrator 72.

Upon receipt of the control signal 144 by the listener module 82(N)(2), the core module 84(N)(2) starts processing the requests 30 thus maintaining continuity of work. Again, any delay in providing services 32 by the application 40 is at most the amount of time required to (i) complete the operations that were in progress by the first copy 102(1) of the new version 80 and (ii) transfer control to the second copy 102(2) of the new version 80.

With the second copy 102(2) of the new version 80 of the application 40 now running in the electronic apparatus 24 and providing services 32 in response to new requests 30, the orchestrator 72 has substantially completed the NDU 42. Nevertheless, the orchestrator 72 may perform a variety of back-end activities before finally terminating. For example, in some arrangements, the orchestrator 72 uninstalls (or deletes) the first copy 102(1) of the new version 80 from the temporary directory 100(T). In some arrangements, the orchestrator 72 removes the temporary directory 100(T) itself. Additionally, in some arrangements, the orchestrator 72 deletes, moves or renames the transaction log 120. Once the back-end activities have been completed, the orchestrator 72 terminates. Further details will now be provided with reference to FIG. 5.

Figure 5:
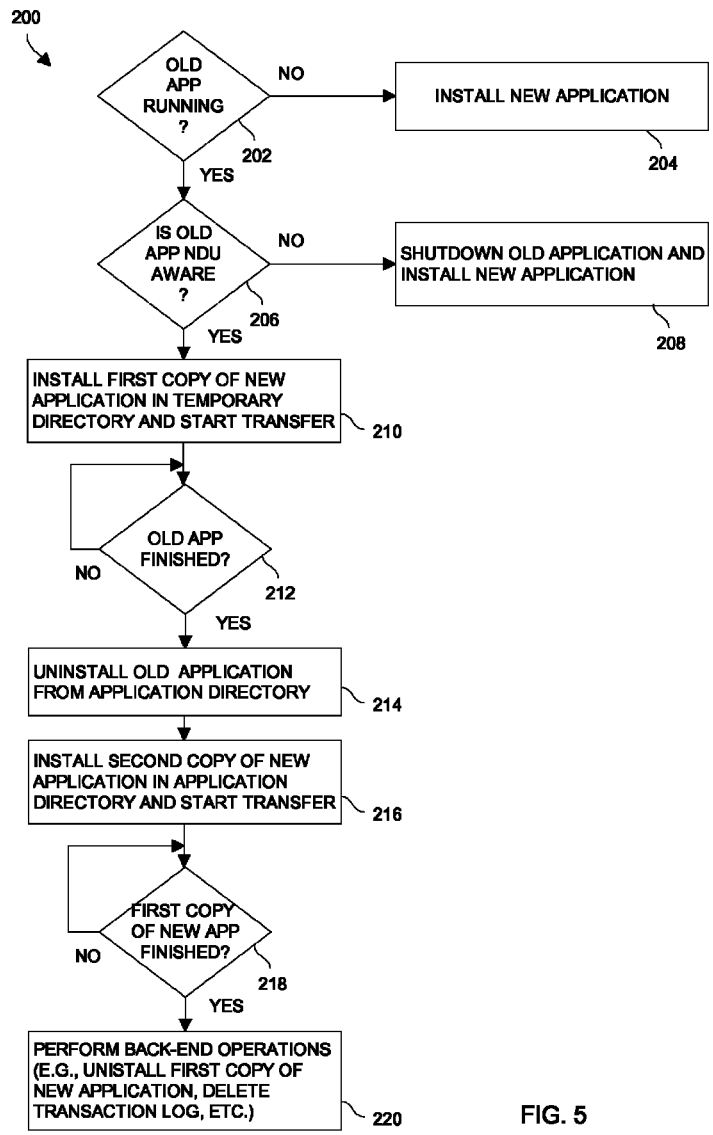
FIG. 5 is a flowchart of a procedure which is performed by the electronic apparatus of FIG. 2.

FIG. 5 is a flowchart of an upgrade procedure 200 which is performed by the electronic apparatus 24 when running in accordance with the NDU protocol. Initially, the user invokes the orchestrator 72 which starts by creating a transaction log to save a history of upgrade events (also see FIGS. 3 and 4). Additionally, it should be understood that the NDU library 74 is accessible in memory by the orchestrator 72 and versions of the application 40 (also see FIG. 2).

In step 202, the orchestrator 72 checks to see if the old (or existing) version 70 of the application 40 to be upgraded is running. If the orchestrator 72 discovers that the old version 70 of the application 40 is not running, the orchestrator 72 proceeds to step 204. However, if the orchestrator 72 determines that the old version 70 of the application 40 is running, the orchestrator 72 proceeds to step 206.

In step 204, when the old version 70 of the application 40 is not running, the orchestrator 72 simply installs the new version 80 of the application 40. In some arrangements, the orchestrator 72 uninstalls (or removes) the old version 70 of the application 40 prior to installing the new version 80. Once the installation is finished, the orchestrator 72 terminates.

In step 206, when the old version 70 of the application 40 is running, the orchestrator 72 checks to see if the old version 70 of the application 40 to be upgraded supports NDU (i.e., the orchestrator 72 determines whether the old version 70 of the application 40 is "NDU aware"). For example, the orchestrator 72 can look for a known signature or registry entry in the operating system (see the other constructs 76 in FIG. 2), check for a version number or for the existence of a special file in the application directory 100(A), and so on. If the orchestrator 72 determines that the old version 70 of the application 40 does not support NDU, the orchestrator 72 proceeds to step 208. However, if the orchestrator 72 determines that the old version 70 of the application 40 supports NDU, the orchestrator 72 proceeds to step 210.

In step 208, when the old version 70 of the application 40 does not support NDU, the orchestrator 72 shuts down the old version 70 of the application 40 and then installs the new version 80 of the application 40. In some arrangements, the orchestrator 72 uninstalls (or removes) the old version 70 of the application 40 prior to installing the new version 80. Again, once the installation is finished, the orchestrator 72 terminates.

In step 210, when the old version 70 of the application 40 supports NDU, the orchestrator 72 is able to carry out NDU 42 and thus avoid application downtime. To this end, the orchestrator 72 installs a first copy 102(1) of the new version 80 of the application 40 in a temporary directory 100(T) and starts a transfer of control from the running old version 70 to the installed first copy 102(1) of the new version 80. Recall that, along these lines, each version 70, 80 of the application 40 that supports NDU is equipped with a listener module 82 which coordinates the transfer of control between versions and a core module 84 which performs the primary operations of the application 40 in order to provide services 32 (also see FIG. 3). Accordingly, a communications channel 130 is established between the listener modules 82 (FIG. 3) and the old version 70 queues new requests 30 while completing previously started operations in response to previous requests 30.

In step 212, the orchestrator 72 waits for (i) the old version 70 of the application 40 to complete the operations and shutdown, and (ii) the first copy 102(1) of the new version 80 of the application 40 to start processing the queued new requests 30. Such operation enables the electronic apparatus 24 to maintain the continuity of work. In some arrangements, the first copy 102(1) of the new version 80 of the application 40 directly notifies the orchestrator 72 to proceed to step 214 (e.g., via a signal from the first copy 102(1) to the orchestrator 72) once the first copy 102(1) has started processing requests 30. In other arrangements, the orchestrator 72 proceeds to step 214 in response to monitoring the first copy 102(1) (e.g., upon a determination that the first copy 102(1) has begun processing requests 30).

In step 214, once the old version 70 is finished and the new version 80 starts, the orchestrator 72 uninstalls the old version 70 from the application directory 100(A). In some arrangements, step 214 is optional.

In step 216, the orchestrator 72 installs the second copy 102(2) of the new version 80 of the application 40 in the application directory 100(A), and then starts a transfer of control to the second copy 102(2). Again, recall that a communications channel 140 is established between the listener modules and the first copy 102(1) of the new version 80 queues additional requests 30 while completing previously started operations in response to previous requests 30.

In step 218, the orchestrator 72 waits for (i) the first copy 102(1) of the new version 80 of the application 40 to complete the operations and shutdown, and (ii) the second copy 102(2) of the new version 80 of the application 40 to start processing the queued additional requests 30. Again, such operation enables the electronic apparatus 24 to maintain the continuity of work. In some arrangements, the second copy 102(2) of the new version 80 of the application 40 directly notifies the orchestrator 72 to proceed to step 220 (e.g., via a signal from the second copy 102(2) to the orchestrator 72). In other arrangements, the orchestrator 72 proceeds to step 220 in response to monitoring the activity of the second copy 102(2) (e.g., upon a determination that the second copy 102(2) has begun processing requests 30).

In step 220, once the first copy 102(1) of the new version 80 is finished and the second copy 102(2) of the new version 80 starts, the orchestrator 72 performs back-end activities and terminates. Examples of back-end activities include outputting a notification, uninstalling the first copy 102(1) of the new version 80 from the temporary directory 100(T), deleting the transaction log, etc. In some arrangements, step 220 is optional and the orchestrator 72 simply terminates.

As mentioned above, improved techniques involve performing an NDU 42 of an application 40 in a manner which maintains continuity of work. In particular, the NDU 42 replaces an older version 70 of the application 40 with a newer version 80 of the application 40 while a temporarily-installed version 80 of the application 40 (e.g., another copy of the newer version 80) continues to perform work. Such operation results in little or no disruption of the services 32 provided by the application 40 while the older version 70 is replaced with the newer version 80.

While various embodiments of the present disclosure have been particularly shown and described, it will be understood by those skilled in the art that various changes in form and details may be made therein without departing from the spirit and scope of the present disclosure as defined by the appended claims.

For example, the electronic apparatus 24 was described above as providing services 32 in response to requests 30 from client devices 22. In other arrangements, the electronic apparatus 24 provides services 32 to local requests 30 (e.g., users or applications running within the electronic apparatus 24). Still, there is no disruption in the continuity of work in these arrangements.

What is claimed is:

1. A method of upgrading an original version of an application to a new version of the application, the method comprising:
    installing a first copy of the new version of the application in a temporary directory;
    after the first copy of the new version of the application is installed in the temporary directory, activating the first copy of the new version of the application, the first copy of the new version of the application being constructed and arranged to, upon activation (i) obtain control from the original version of the application while the original version of the application is installed in an application directory and (ii) shut down the original version of the application upon obtaining control from the original version of the application;
    after the first copy of the new version of the application obtains control from the original version of the application and the original version of the application is shut down, installing a second copy of the new version of the application in the application directory; and
    after the second copy of the new version of the application is installed in the application directory, activating the second copy of the new version of the application, the second copy of the new version of the application being constructed and arranged to, upon activation (i) obtain control from the first copy of the new version of the application while the first copy of the new version of the application is installed in the temporary directory and (ii) shut down the first copy of the new version of the application upon obtaining control from the first copy of the new version of the application.

2. A method as in claim 1 wherein activating the first copy of the new version of the application includes:
    directing the first copy of the new version of the application to (i) establish a communications channel between the original version of the application and the first copy of the new version of the application, and (ii) await receipt of a transfer acknowledge signal from the original version of the application through the communications channel.

3. A method as in claim 2 wherein the transfer acknowledge signal from the original version of the application indicates (i) that the original version of the application has completed all previously started operations which were previously started by the original version of the application in response to previous external requests, and (ii) that the first copy of the new version of the application has control to start new operations in response to new external requests which were queued while the original version of the application was completing the previously started operations.

4. A method as in claim 3, further comprising:
    preventing the original version of the application from initiating new operations in response to the new external requests and queuing the new external requests while the original version of the application completes all previously started operations which were previously started by the original version of the application in response to previous external requests.

5. A method as in claim 2 wherein activating the first copy of the new version of the application further includes:
    after the original version of the application sends the transfer acknowledge signal to the first copy of the new version of the application through the communications channel and prior to installing the second copy of the new version of the application in the application directory, providing a shutdown command to the original version of the application to shutdown the original version of the application.

6. A method as in claim 5 wherein activating the first copy of the new version of the application further includes:
    after the original version of the application has shutdown in response to the shutdown command and prior to installing the second copy of the new version of the application in the application directory, uninstalling the original version of the application from the application directory.

7. A method as in claim 2 wherein activating the second copy of the new version of the application includes:
    directing the second copy of the new version of the application to (i) establish a communications channel between the first copy of the new version of the application and the second copy of the new version of the application, and (ii) await receipt of a transfer acknowledge signal from the first copy of the new version of the application through the communications channel.

8. A method as in claim 7 wherein the transfer acknowledge signal from the first copy of the new version of the application indicates (i) that the first copy of the new version of the application has completed all previously started operations which were previously started by the first copy of the new version of the application, and (ii) that the second copy of the new version of the application has control to start additional operations in response to additional external requests which were queued while the first copy of the new version of the application was completing the previously started operations which were previously started by the first copy of the new version of the application.

9. A method as in claim 8, further comprising:
preventing the first copy of the new version of the application from initiating additional operations in response to the additional external requests and queuing the additional external requests while the first copy of the new version of the application completes all previously started operations which were previously started by the first copy of the new version of the application.

10. A method as in claim 7 wherein activating the second copy of the new version of the application further includes:
after the first copy of the new version of the application sends the transfer acknowledge signal to the second copy of the new version of the application through the communications channel, providing a shutdown command to the first copy of the new version of the application to shutdown the first copy of the new version of the application.

11. A method as in claim 10 wherein activating the second copy of the new version of the application further includes:
after the first copy of the new version of the application has shutdown in response to the shutdown command, uninstalling the first copy version of the application from the temporary directory.

12. A method as in claim 1, further comprising:
creating a transaction log in memory, the transaction log being constructed and arranged to persist throughout a reboot process; and
updating the transaction log with upgrade information from an orchestrator program which installs the first and second copies of the new version of the application and from each of the first and second copies of the new version of the application.

13. A method as in claim 12 wherein a reboot process takes place after the transaction log is created, and wherein the method further comprises:
following the reboot process, (i) accessing the transaction log in the memory to identify completed upgrade activity, and (ii) resuming completion of uncompleted upgrade activity.

14. A method as in claim 13, further comprising:
deleting the transaction log from the memory upon completion of all of the upgrade activity.

15. An electronic apparatus, comprising:
a network interface;
memory; and
a controller coupled to the network interface and the memory, the controller being constructed and arranged to upgrade an original version of an application to a new version of the application by:
installing a first copy of the new version of the application in a temporary directory of the memory,
after the first copy of the new version of the application is installed in the temporary directory, activating the first copy of the new version of the application, the first copy of the new version of the application being constructed and arranged to, upon activation (i) obtain control from the original version of the application while the original version of the application is installed in an application directory of the memory and (ii) shut down the original version of the application upon obtaining control from the original version of the application,
after the first copy of the new version of the application obtains control from the original version of the application and the original version of the application is shut down, installing a second copy of the new version of the application in the application directory of the memory, and after the second copy of the new version of the application is installed in the application directory of the memory, activating the second copy of the new version of the application, the second copy of the new version of the application being constructed and arranged to, upon activation (i) obtain control from the first copy of the new version of the application while the first copy of the new version of the application is installed in the
temporary directory of the memory and (ii) shut down the first copy of the new version of the application upon obtaining control from the first copy of the new version of the application.

16. An electronic apparatus as in claim 15 wherein the controller, when activating the first copy of the new version of the application, is constructed and arranged to:
direct the first copy of the new version of the application to (i) establish a communications channel between the original version of the application and the first copy of the new version of the application, and (ii) await receipt of a transfer acknowledge signal from the original version of the application through the communications channel.

17. An electronic apparatus as in claim 16 wherein the transfer acknowledge signal from the original version of the application indicates (i) that the original version of the application has completed all previously started operations which were previously started by the original version of the application in response to previous external requests, and (ii) that the first copy of the new version of the application has control to start new operations in response to new external requests which were queued while the original version of the application was completing the previously started operations.

18. An electronic apparatus as in claim 16 wherein the controller is further constructed and arrange to:
prevent the original version of the application from initiating new operations in response to the new external requests and queue the new external requests while the original version of the application completes all previously started operations which were previously started by the original version of the application in response to previous external requests.

19. A computer program product having a non-transitory computer readable storage medium which stores a set of instructions that, when performed by a computerized device, causes the computerized device to upgrade an original version of an application to a new version of the application by:
installing a first copy of the new version of the application in a temporary directory;
after the first copy of the new version of the application is installed in the temporary directory, activating the first copy of the new version of the application, the first copy of the new version of the application being constructed and arranged to, upon activation (i) obtain control from the original version of the application while the original version of the application is installed in an application directory and (ii) shut down the original version of the application upon obtaining control from the original version of the application;

after the first copy of the new version of the application obtains control from the original version of the application and the original version of the application is shut down, installing a second copy of the new version of the application in the application directory; and after the second copy of the new version of the application is installed in the application directory, activating the second copy of the new version of the application, the second copy of the new version of the application being constructed and arranged to, upon activation (i) obtain control from the first copy of the new version of the application while the first copy of the new version of the application is installed in the temporary directory and (ii) shut down the first copy of the new version of the application upon obtaining control from the first copy of the new version of the application.

\* \* \* \* \*